(No Model.)
A. FAY.
COFFEE POT.
No. 538,191.
Patented Apr. 23, 1895.
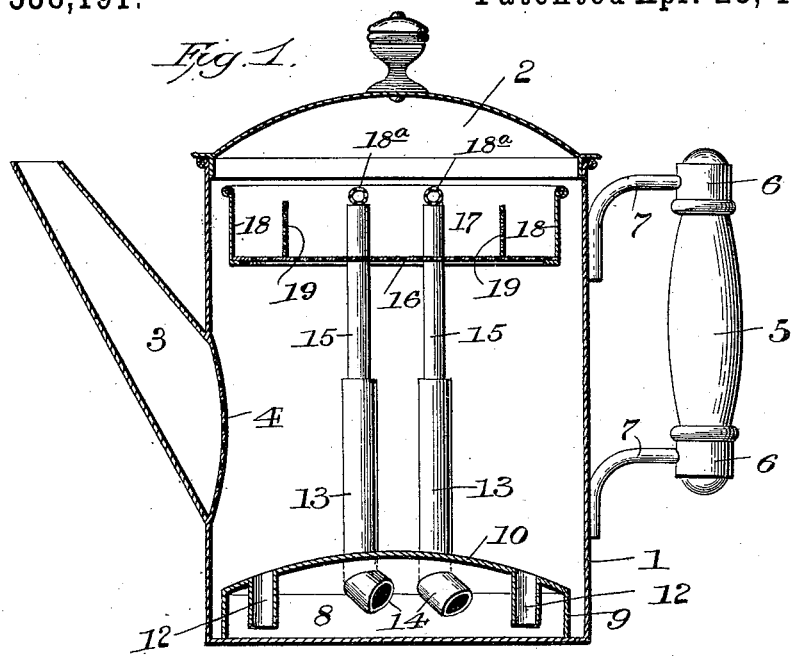
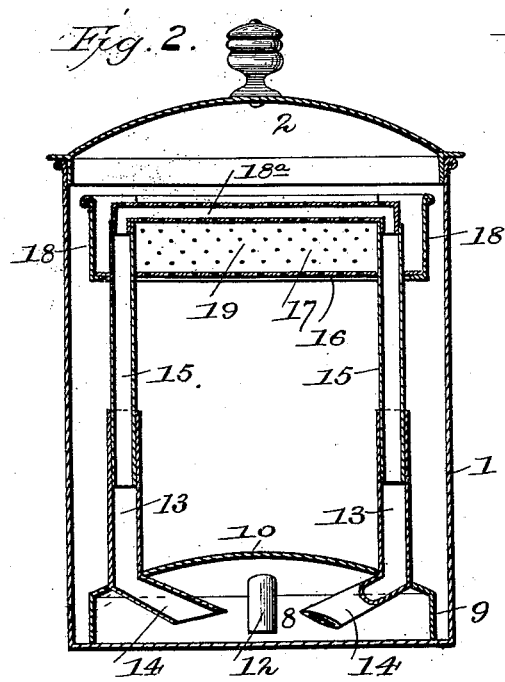
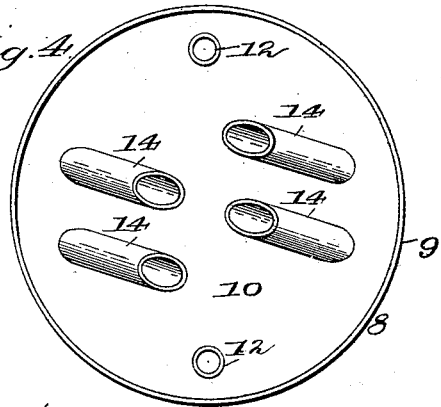
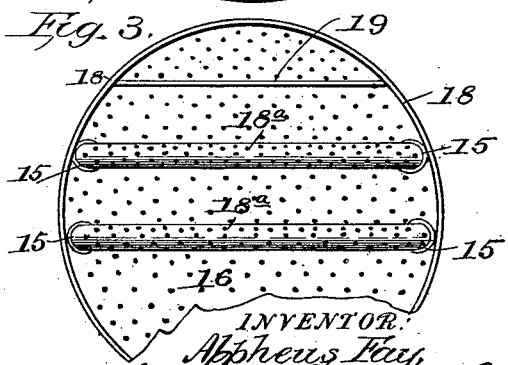
WITNESSES:
F. L. Durand.
W. L. Coombs.
INVENTOR:
Alpheus Fay,
by Laws Bagger & Co.
Attorneys.

UNITED STATES PATENT OFFICE.

ALPHEUS FAY, OF CINCINNATI, OHIO.

COFFEE-POT.

SPECIFICATION forming part of Letters Patent No. 538,191, dated April 23, 1895.

Application filed February 5, 1895. Serial No. 537,381. (No model.)

*To all whom it may concern:*

Be it known that I, ALPHEUS FAY, a citizen of the United States, and a resident of Cincinnati, in the county of Hamilton and State of Ohio, have invented certain new and useful Improvements in Coffee-Pots; and I do hereby declare that the following is a full, clear, and exact description of the invention, which will enable others skilled in the art to which it appertains to make and use the same, reference being had to the accompanying drawings, which form a part of this specification.

My invention relates to that class of coffee-pots in which the ground coffee is held in an elevated position and boiling water allowed to percolate therethrough into the pot below, and its object is to provide an improved construction of the same, whereby I secure superior advantages with respect to efficiency in use.

The invention consists in the novel construction and combination of parts hereinafter fully described and claimed.

In the accompanying drawings, Figure 1 is a central longitudinal sectional view of a coffee pot, constructed in accordance with my invention. Fig. 2 is a similar view, taken at right angles to Fig. 1. Fig. 3 is a plan view of the cup or receptacle for containing the ground coffee. Fig. 4 is a view of the base looking from the under side.

In the said drawings, the reference numeral 1 designates a coffee-pot having a cover 2, a spout 3, provided at its inner end with an oblong plate 4 of perforated metal, and a handle 5, made of wood or other non-conducting material, connected by metal sockets 6 at each end with curved rods 7, soldered to the pot.

The numeral 8 designates a base consisting of an annular rim 9, and a concavo-convex top 10, and is designed to fit in the pot, the rim 9 resting on the bottom thereof. The cover 10 is provided with two diametrically opposite pipes 12, communicating with the space above the cover. Secured to said cover are four vertical pipes 13, two at each side, or diametrically opposite to each other, the lower ends of which communicate with four inwardly extending and downwardly inclined pipes 14, the ends of which are cut off horizontally, so as to present a large opening at said ends. These pipes are somewhat larger than the pipes 13, with which they communicate, and they are inclined laterally or sidewise, see Fig. 4, as well as downwardly, so that the openings therein will not be in line with each other. Telescoping within the pipes 13 are four pipes 15, which extend up through the perforated bottom 16 of a ground coffee receptacle 17, provided with an imperforate rim 18. Connected with these pipes 15, are transverse perforated pipes 13ª, the ends of which are bent downward at right angles and telescope in the upper ends of said pipes.

The numeral 19 designates two transverse perforated partitions, which do not extend quite up to the top of the coffee receptacle, and divide the same into three compartments.

The percolating device comprising the base, the pipes, the coffee receptacle, and connections, is placed in the pot with the rim of the base resting in the bottom thereof.

A sufficient quantity of water is poured into the pot to reach a level just below the coffee receptacle, the water also filling the space between the cover of the base and the bottom of the pot, through the pipes 12, and rising in the vertical pipes to the level in the pot. Ground coffee is then put in the middle compartment of the coffee receptacle, and the pot is placed on a stove or other heater, and when the water has reached the boiling point it will be forced up through the pipes 13 and 15 into the transverse perforated pipes from which it will be sprayed upon the coffee and percolating therethrough will escape into the pot beneath in a clear and clarified condition. A constant circulation will be kept up as long as the water is kept at the boiling point.

By reason of the peculiar construction of the sidewise and downwardly inclined pipes 14, better results are attained, than if the same were cut off square instead of obliquely, as shown.

The pipes 15 telescoping into the pipes 13 allow the coffee receptacle to be adjusted vertically to accommodate it to different sized pots. It may also be adjusted to accommodate it to different quantities of coffee to be made, as it is very essential that the water level in the pot should be just below the coffee receptacle, and when the amount of coffee to be made is, for example, only one-third the capacity of the pot, the latter will be only one-third filled, and the coffee receptacle pushed down, so that it will nearly reach the water level. By this means the water will not have to be forced as high as if the coffee receptacle were stationary or non-adjustable.

The object of the transverse pipes telescoping in the pipes 15 is that they may be removed for cleansing purposes and the object of the perforated partitions is that when the water is fed too fast to the central compartment containing the coffee, it will overflow into the side compartments and pass therethrough into the pot, without carrying any grounds with it.

When the coffee is ground very fine it should be placed in a bag or sack before being put in the receptacle, but if coarsely ground, it can be placed loose therein.

Having thus fully described my invention, what I claim is—

1. In a percolating device for coffee pots, the combination with the base, the diametrically opposite pipes in the top thereof, the vertical pipes and the enlarged sidewise and downwardly inclined pipes communicating therewith, and having their inner ends cut off obliquely, of the pipes telescoping within said vertical pipes, the coffee receptacle having a perforated bottom through which said pipes pass and the transverse perforated pipes connected with the upper ends of said pipes, substantially as described.

2. In a percolating device for coffee pots, the combination with the base, the diametrically opposite pipes in the top thereof, the diametrically opposite vertical pipes and the enlarged sidewise and downwardly inclined pipes communicating therewith and having their inner ends cut off obliquely, of the pipes telescoping within said vertical pipes, the coffee receptacle having a perforated bottom through which said pipes pass, the transverse perforated pipes having their ends bent at right angles and telescoping in said pipes and the perforated partitions, substantially as described.

In testimony that I claim the foregoing as my own I have hereunto affixed my signature in presence of two witnesses.

ALPHEUS FAY.

Witnesses:
JAMES G. BROWN,
THOMAS J. TINGLE.